(12) United States Patent
Avins

(10) Patent No.: US 9,816,564 B2
(45) Date of Patent: Nov. 14, 2017

(54) SPRING RETAINER INCLUDING RIVETS FOR DRIVING SPRINGS IN A TORQUE CONVERTER DAMPER

(71) Applicant: Schaeffler Technologies AG & Co. KG, Herzogenaurach (DE)

(72) Inventor: David Avins, Burbank, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 59 days.

(21) Appl. No.: 14/924,963

(22) Filed: Oct. 28, 2015

(65) Prior Publication Data
US 2016/0123402 A1 May 5, 2016

Related U.S. Application Data

(60) Provisional application No. 62/073,151, filed on Oct. 31, 2014.

(51) Int. Cl.
*F16D 3/12* (2006.01)
*F16H 41/04* (2006.01)
*F16F 15/123* (2006.01)
*F16H 45/02* (2006.01)

(52) U.S. Cl.
CPC .......... *F16D 3/12* (2013.01); *F16F 15/1232* (2013.01); *F16F 15/12326* (2013.01); *F16F 15/12333* (2013.01); *F16H 41/04* (2013.01); *F16H 45/02* (2013.01); *F16H 2045/0205* (2013.01); *F16H 2045/0226* (2013.01); *F16H 2045/0263* (2013.01)

(58) Field of Classification Search
CPC .... F16D 3/12; F16D 33/18; F16F 1/12; F16F 15/1232; F16F 15/12326; F16F 15/12333; F16F 15/1343; F16F 15/13438; F16F 15/13446; F16H 41/04; F16H 45/02; F16H 2045/0205; F16H 2045/0226; F16H 2045/0263
See application file for complete search history.

(56) References Cited

U.S. PATENT DOCUMENTS

| | | | |
|---|---|---|---|
| 8,403,762 B2 * | 3/2013 | Steinberger | F16F 15/13492 192/3.29 |
| 9,115,765 B2 * | 8/2015 | Mahe | F16D 3/12 |
| 2010/0098516 A1 | 4/2010 | Zaugg | |

* cited by examiner

*Primary Examiner* — Logan Kraft
(74) *Attorney, Agent, or Firm* — Davidson, Davidson & Kappel, LLC

(57) ABSTRACT

A spring retainer for a damper for use in a torque converter is provided. The spring retainer includes a ring including a radially extending base and a spring retaining portion radially outside of the base. The spring retaining portion includes rounded sections spaced circumferentially from each other and shoulders circumferentially between the rounded sections. Each rounded section is configured for receiving an arc spring. The spring retainer also includes rivets fixed to the shoulders. The rivets protrude axially from the shoulders into an interior of the spring receiving portion and are arranged for contacting ends of the springs. A method of forming a spring retainer is also provided.

16 Claims, 3 Drawing Sheets

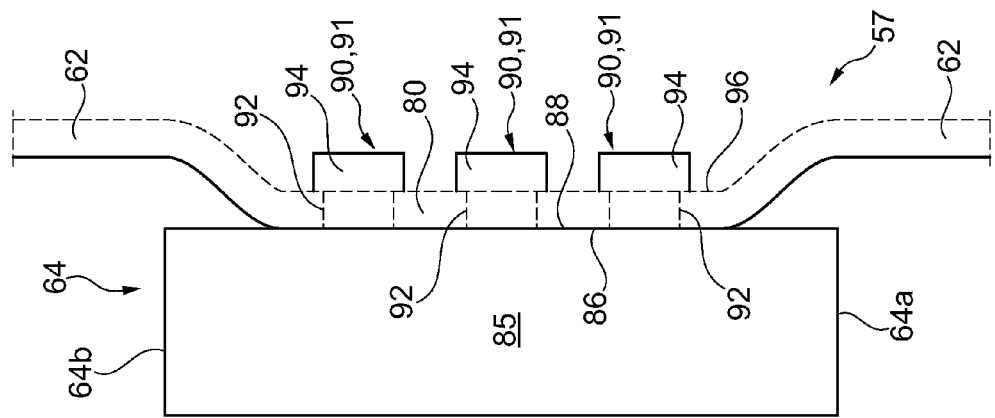
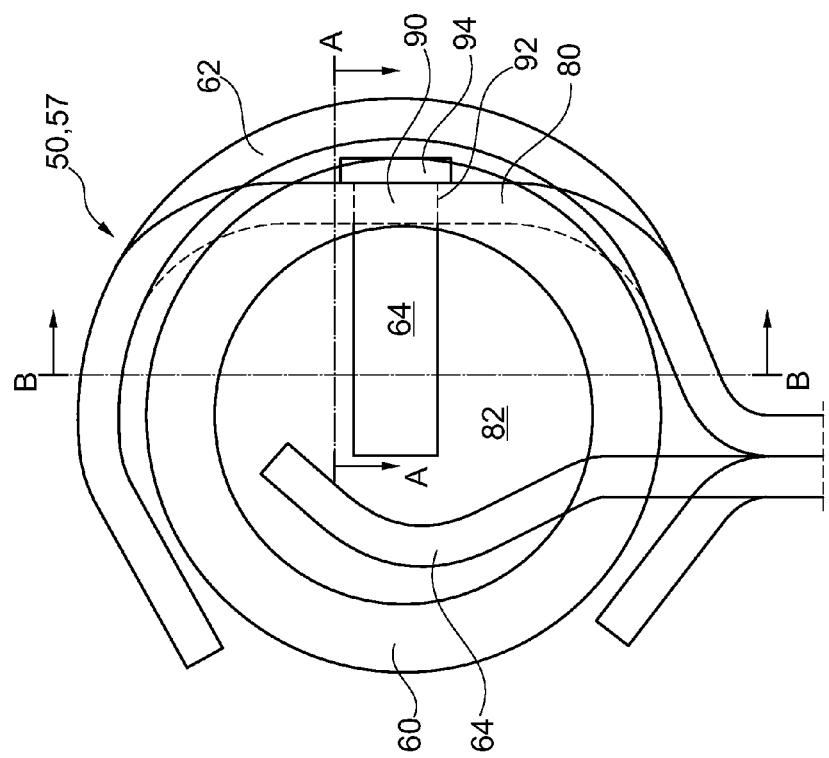

the benefit to U.S. Provisional Patent Application No. 62/073,151 filed Oct. 31, 2014, which is hereby incorporated by reference herein.

SPRING RETAINER INCLUDING RIVETS FOR DRIVING SPRINGS IN A TORQUE CONVERTER DAMPER

This claims the benefit to U.S. Provisional Patent Application No. 62/073,151 filed Oct. 31, 2014, which is hereby incorporated by reference herein.

The present disclosure relates generally to torque converters and more specifically to spring retainers for use in torque converter dampers.

BACKGROUND

Stops of spring retainers are commonly stamped into an arc spring channel portion of the outer diameter of the spring retainer.

U.S. Publication No. 2010/098516 discloses a sheet metal rivet and mentions using the sheet metal rivet for mistake proofing the orientation of a damper assembly.

SUMMARY OF THE INVENTION

A spring retainer for a damper for use in a torque converter is provided. The spring retainer includes a ring including a radially extending base and a spring retaining portion radially outside of the base. The spring retaining portion includes rounded sections spaced circumferentially from each other and shoulders circumferentially between the rounded sections. Each rounded section is configured for receiving an arc spring. The spring retainer also includes rivets fixed to the shoulders. The rivets protrude axially from the shoulders into an interior of the spring receiving portion and are arranged for contacting ends of the springs.

A damper is also provided. The damper includes the spring retainer and arc springs held in the rounded sections. The ends of the arc springs contact the rivets during operation of the damper. The damper also includes a drive plate including circumferentially spaced drive tabs extending into circumferential spaces between the arc springs.

A method of forming a spring retainer assembly is also provided. The method includes providing rivets in an interior of a spring receiving portion of a spring retainer and providing arc springs in the interior of the spring receiving portion circumferentially between the rivets such that the rivets are configured for circumferential driving engagement with the arc springs during operation of the spring retainer in a damper.

BRIEF DESCRIPTION OF THE DRAWINGS

The present invention is described below by reference to the following drawings, in which:

FIG. 2 shows an enlarged cross-sectional side view of a spring retaining portion of a spring retainer of the damper;

FIG. 3 shows a view of the spring retaining portion along A-A in FIG. 2; and

DETAILED DESCRIPTION

The present disclosure uses cantilevered sheet metal rivet to drive a portion of an arc spring in a spring retainer. Drive tabs of a drive plate are also used to drive an axially distal portion of the spring. Such an arrangement may reduce stresses normally associated with crimped spring retainers in high stress applications.

Figure 1:
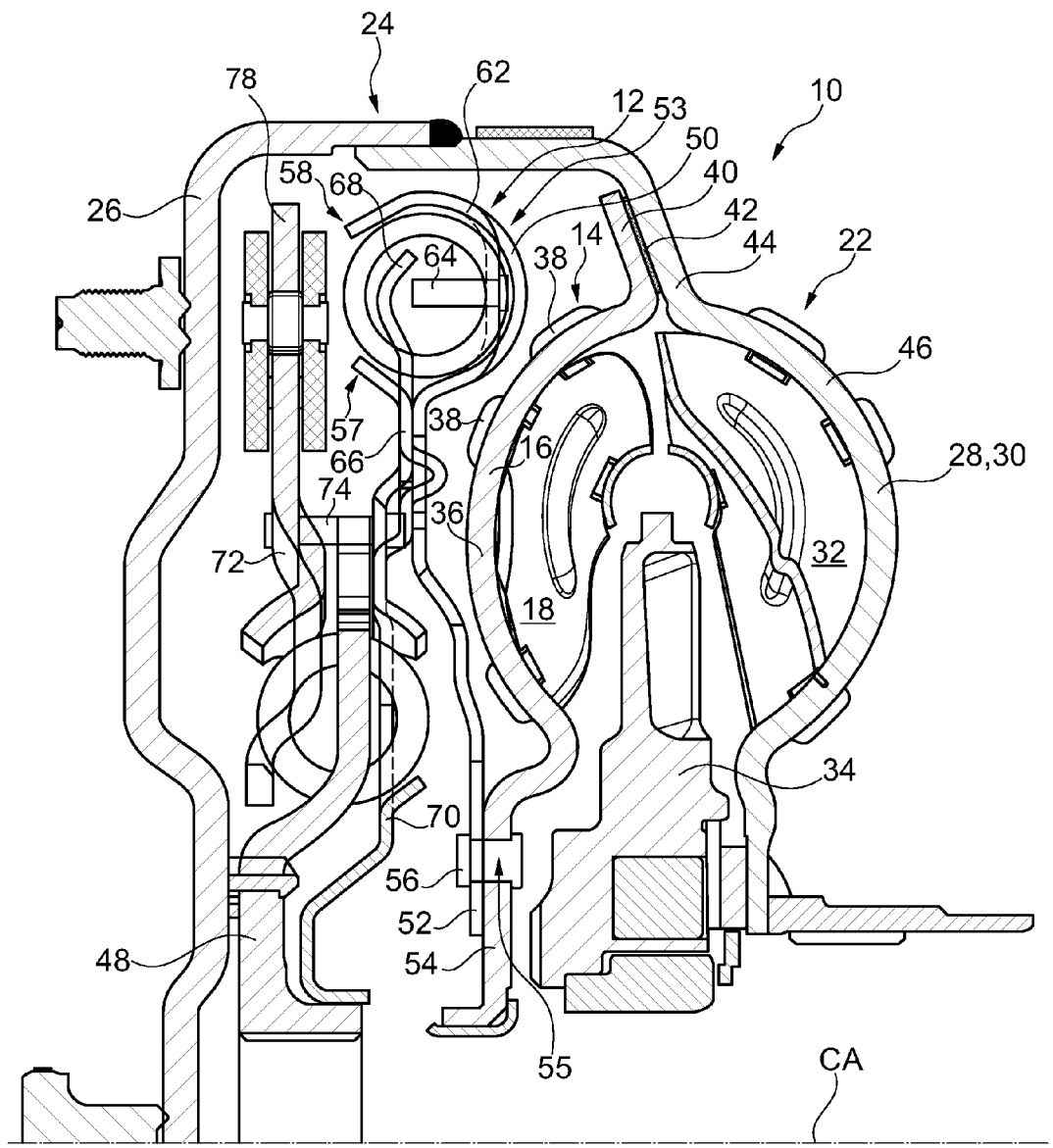
FIG. 1 shows a half cross-sectional side view of a torque converter including a damper in accordance with an embodiment of the present invention.

FIG. 1 shows a half cross-sectional side view of a torque converter 10 including a damper 12 in accordance with an embodiment of the present invention. Torque converter 10 further includes a turbine 14, which includes a turbine shell 16 and a plurality of turbine blades 18 fixed on turbine shell 16. Turbine 14 is axially movable toward and away from an impeller 22 to engage and disengage turbine 14 from impeller 22 and a cover 24 of torque converter 10 so as to operate as a piston of a lock-up clutch of torque converter 10. Cover 24 includes a front cover 26 for connecting to a crankshaft of an internal combustion engine and a rear cover 28 forming a shell 30 of impeller 22. Front cover 26 and rear cover 28 are both substantially cup shaped and are joined by providing an axial extension of front cover 26 radially inside of an axial extension of rear cover 28 and then welding the axial extensions together. Impeller shell 30 supports a plurality of impeller blades 32 on an inner axial surface thereof. Torque converter 10 also includes a stator 34 between turbine 14 and impeller 22.

Turbine shell 16 includes a rounded blade support portion 36 supporting turbine blades 18. Turbine blades 18 may be connected to turbine shell 16 via blade tabs 38 that are inserted in slots passing through turbine shell 16 and bent to engage a surface of turbine shell 16 facing away from turbine blades 18. In a preferred embodiment, after blades 18 are connected to turbine shell 16 by tabs 38, blades 18 are brazed to turbine shell 16. The brazing may be accomplished as described in U.S. Pat. No. 7,918,645.

Turbine shell 16 further includes an outer radial extension 40 radially protruding from blade support portion 36. Outer radial extension 40 has a friction surface formed by a frictional material 42 on axial side of outer radial extension 40 facing toward rear cover 28. Turbine shell 16 selectively engages impeller 22 at a radially extending portion 44 of impeller shell 30, which extends radially from a rounded blade support portion 46 of impeller 22 supporting impeller blades 32, via friction material 42 to transfer torque input into front cover 26 by the engine crankshaft to a torque output flange 48 of damper 12 when turbine 14 and impeller 22 have the same rotational velocity. Turbine 14 is axially slidable toward and away from impeller 22 based on specified pressure settings in torque converter 10.

Damper 12 includes a spring retainer 50 fixing damper 12 to turbine 14. Specifically, an inner radial end 52 of spring retainer 50 is fixed to radial inner end 54 of turbine shell 16 by a plurality of fasteners 56, which in this embodiment are rivets. As turbine 14 is driven by impeller 22 about center axis CA, either through contact via friction material 42 on outer radial extension 40 and impeller shell 30 or through fluid flow between blades 18, 32, turbine 14 transfers torque to damper 12 via spring retainer 50.

Spring retainer 50 including a ring 53 including a radially extending base 55 and a spring retaining portion 57 radially outside of the base 55. Spring retaining portion 57, at a radial outer end 58 of spring retainer 50, retains a plurality of circumferentially spaced arc spring 60. Together, spring retainer 50 and springs 60 form a spring retainer assembly. To retain springs 60, spring retaining portion 57 includes rounded sections 62 for encircling a portion a circumference of springs 60. Spring retainer 50 also includes a plurality of rivets 64, which in this embodiment are sheet metal rivets, for contacting the ends of springs 60. During operation of torque converter 10, spring retainer 50 drives springs 60 circumferentially about center axis CA via rivets 64. Springs 60 in turn circumferentially drive a drive plate 66 including circumferentially spaced drive tabs 68 extending into the circumferential spaces between arc springs 60. Drive plate 66 is integrally formed with a first cover plate 70 that is fixed to a second cover plate 72 via fasteners 74. Cover plates 70, 72 hold and drive a plurality of radially inner springs 76, which in turn circumferentially drive torque output flange 48 about center axis CA. Damper 38 further includes a centrifugal pendulum absorber 78 integrally formed on a radial outer end of cover plate 72.

Figure 4:
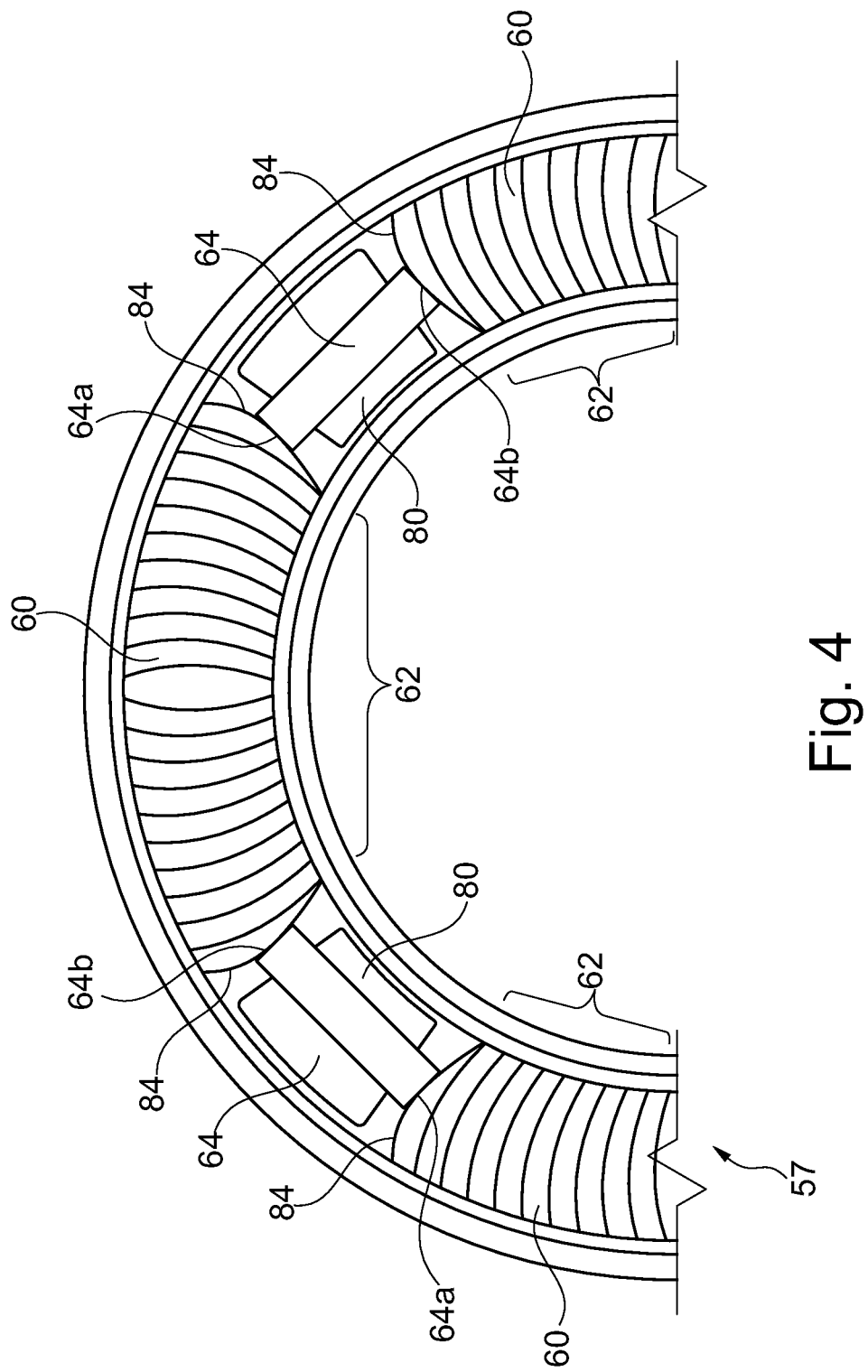
FIG. 4 shows a view of the spring retaining portion along B-B in FIG. 2.

FIG. 2 shows an enlarged cross-sectional side view of spring retaining portion 57 of spring retainer 50. FIG. 3 shows a view of spring retaining portion 57 along A-A in FIG. 2 and FIG. 4 shows a view of spring retaining portion 57 along B-B in FIG. 2. Rounded sections 62 are spaced circumferentially from each other and each rounded section 62 is configured for receiving one arc spring 60. Spring retaining portion 57 also includes a plurality of flat shoulders 80, each being circumferentially between two rounded sections 62. Rivets 64 are cantilevered to shoulders 80 and protrude axially from 80 shoulders into an interior 82 of spring receiving portion 57. Rivets 64 and shoulders 80 are circumferentially aligned with drive tabs 64. Rivets 64 are arranged for contacting ends 84 of springs 60, with each rivet 64 being circumferentially between two springs 60. Each rivet 64 extends along a length of a corresponding one of shoulders 80 and includes a first end 64a for contacting end 84 a first adjacent one of springs 60 and a second end 64b for contacting end 84 of a second adjacent one of springs 60. First end 64a and second end 64b extend past the corresponding ends of the corresponding shoulder 80.

As shown in FIG. 3, each rivet 64 includes a base 85 shaped as a rectangular box. Base 85 includes a base edge 86, which faces away from interior 82, contacting an inner surface 88 of the corresponding shoulder 80, which faces toward interior 82. Base edge 86 extends between first end 64a and second end 64b. Each rivet 60 also includes at least one connector 90 extending from base edge 86 through at least one hole 92 in corresponding shoulder 80. Each connector 90 is formed as a projection 91 extending form base 85 and includes a head 94 for contacting an outer surface 96 of the corresponding shoulder 80, which faces away from interior 82.

A preferred method of forming spring retainer 50 includes cutting rivets 64 out of sheet metal, forming flat shoulders 80 into spring receiving portion 57 and cutting holes 92 into shoulders 80. These steps may be performed simultaneously or in any order. Each rivet 64 is formed to include a rectangular base 85 for contacting the corresponding arc springs 60 and at least one projection 91 extending from base edge 86 of base 85. Rivets 64 are provided in interior 82 of spring receiving portion 57. This includes passing ends of projections 91 through corresponding holes 92 in spring receiving portion 57 and contacting inner surfaces 88 of flat shoulders 80 with base edges 86 of the rectangular bases of rivets 64. Then, ends of projections 91 are contacted with a tool and displaced to form heads 94 contacting outer surfaces 94 of flat shoulders 80 such that heads 94 fix rivets 64 to spring receiving portion 57.

Arc springs 60 may then be provided in interior 82 of spring receiving portion 57 circumferentially between rivets 64 such that rivets 64 are configured for circumferential driving engagement with arc springs 60 during operation of spring retainer 50 in damper 12.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A spring retainer for a damper for use in a torque converter comprising:
   a ring including a radially extending base and a spring retaining portion radially outside of the base, the spring retaining portion including rounded sections spaced circumferentially from each other, each rounded section being configured for receiving an arc spring, the spring retaining portion including shoulders circumferentially between the rounded sections; and
   rivets fixed to the shoulders, the rivets protruding axially from the shoulders into an interior of the spring receiving portion, the rivets being arranged for contacting ends of the springs, the rivets being thicker in an axial direction than in a radial direction with respect to a center axis about which the spring retainer is designed to rotate in the torque converter.

2. The spring retainer as recited in claim 1 wherein each rivet extends along a length of a corresponding one of the shoulders and includes a first end for contacting a first of the springs and second end for contacting a second of the springs.

3. The spring retainer as recited in claim 2 wherein each rivet includes a base edge contacting an inner surface of the corresponding shoulder, the base edge extending between the first and second ends.

4. The spring retainer as recited in claim 3 wherein each rivet includes at least one connector extending from the base edge through at least one hole in the corresponding shoulder.

5. The spring retainer as recited in claim 4 wherein the each connector includes a head for contacting an outer surface of the corresponding shoulder.

6. The spring retainer as recited in claim 1 wherein the rivets are sheet metal rivets.

7. A damper comprising:
   the spring retainer as recited in claim 1;
   the arc springs held in the rounded sections, ends of the arc springs contacting the rivets during operation of the damper;
   a drive plate including circumferentially spaced drive tabs extending into circumferential spaces between the arc springs.

8. The damper as recited in claim 7 wherein the drive tabs are circumferentially aligned with the shoulders.

9. The damper as recited in claim 7 further comprising an output flange connected to the drive plate, the output flange configured for connection to a transmission input shaft.

10. A torque converter comprising:
    the damper as recited in claim 7;
    a turbine fixed to the spring retainer.

11. A method of forming a spring retainer assembly comprising:
    providing rivets in an interior of a spring receiving portion of a spring retainer; and
    providing arc springs in the interior of the spring receiving portion circumferentially between the rivets such that the rivets are configured for circumferential driving engagement with the arc springs during operation of the spring retainer in a damper, the rivets being thicker in an axial direction than in a radial direction with respect to a center axis about which the spring retainer is designed to rotate in a torque converter.

12. The method as recited in claim 11 further comprising cutting the rivets out of sheet metal.

13. The method as recited in claim 11 wherein the rivets each include a rectangular base for contacting the corresponding arc springs and at least one projection extending from the base, the providing the rivets in the interior of the spring receiving portion including passing ends of the projections through corresponding holes in the spring receiving portion and displacing the ends of the projection to fix the rivets to the spring receiving portion.

14. The method as recited in claim 13 wherein the providing the rivets in the interior of the spring receiving portion includes contacting of inner surfaces of flat shoulders of the spring receiving portion with base edges of the rectangular bases of the rivets, the displacing the ends of the projections including contacting the ends of the projections with a tool to form rivet heads contacting outer surfaces of the flat shoulders.

15. A method of forming a spring retainer assembly comprising:
provy rivets in an interior of a spring receiving portion of a spring retainer; and
providing arc springs in the interior of the spring receiving portion circumferentially between the rivets such that the rivets are configured for circumferential driving engagement with the arc springs during operation of the spring retainer in a damper,
wherein the rivets each include a rectangular base for contacting the corresponding arc springs and at least one projection extending from the base, the providing the rivets in the interior of the spring receiving portion including passing ends of the projections through corresponding holes in the spring receiving portion and displacing the ends of the projections to fix the rivets to the spring receiving portion.

16. The method as recited in claim 15 wherein the providing the rivets in the interior of the spring receiving portion includes contacting of inner surfaces of flat shoulders of the spring receiving portion with base edges of the rectangular bases of the rivets, the displacing the ends of the projections including contacting the ends of the projections with a tool to form rivet heads contacting outer surfaces of the flat shoulders.

* * * * *